United States Patent
Kim et al.

(10) Patent No.: US 9,976,633 B2
(45) Date of Patent: May 22, 2018

(54) PLANETARY GEAR TRAIN OF AUTOMATIC TRANSMISSION FOR VEHICLES

(71) Applicant: Hyundai Motor Company, Seoul (KR)

(72) Inventors: Jin Ho Kim, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Tae Whan Kim, Suji-gu (KR); Seongwook Ji, Gunpo-si (KR); Chon Ok Kim, Suji-gu (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/373,306

(22) Filed: Dec. 8, 2016

(65) Prior Publication Data
US 2018/0094699 A1    Apr. 5, 2018

(30) Foreign Application Priority Data
Oct. 4, 2016  (KR) .................. 10-2016-0127464

(51) Int. Cl.
*F16H 3/66*  (2006.01)
(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS

| | | | |
|---|---|---|---|
| 7,285,069 B2* | 10/2007 | Klemen | F16H 3/66 475/275 |
| 8,409,047 B2* | 4/2013 | Borgerson | F16H 3/666 475/284 |

(Continued)

FOREIGN PATENT DOCUMENTS

KR    20130031457 A    3/2013

*Primary Examiner* — Dirk Wright
(74) *Attorney, Agent, or Firm* — Slater Matsil, LLP

(57) ABSTRACT

A planetary gear train of an automatic transmission includes an input shaft for receiving an engine torque, an output shaft outputting changed torque, a first planetary gear set including a first, second, and third rotation elements, a second planetary gear set including a fourth, fifth, and sixth rotation elements, a third planetary gear set including a seventh, eighth, and ninth rotation elements, a fourth planetary gear set including a tenth, eleventh and twelfth rotation elements, a first shaft connected with the first rotational element, a second shaft interconnecting the second rotational element and the fourth rotational element and connected with the input shaft, a third shaft interconnecting the third rotational element and the tenth rotational element, a fourth shaft interconnecting the fifth rotational element and the eighth element, a fifth shaft connected with the sixth rotational element, and a sixth shaft connected with the seventh rotational element.

10 Claims, 2 Drawing Sheets

(56) References Cited

U.S. PATENT DOCUMENTS

| | | | |
|---|---|---|---|
| 8,784,259 B2 | 7/2014 | Shim et al. | |
| 8,840,520 B2 * | 9/2014 | Neelakantan | F16H 59/38 |
| | | | 475/280 |
| 8,939,863 B2 * | 1/2015 | Hart | F16H 3/62 |
| | | | 475/276 |
| 9,523,412 B2 * | 12/2016 | Lee | F16H 3/66 |
| 9,784,339 B2 * | 10/2017 | Park | F16H 3/66 |
| 9,791,022 B2 * | 10/2017 | Lee | F16H 3/66 |
| 9,822,846 B2 * | 11/2017 | Lee | F16H 3/66 |

* cited by examiner

FIG. 2

| Shift-stage | Control element | | | | | | | Gear ratio | Step ratio | Remark |
|---|---|---|---|---|---|---|---|---|---|---|
| | C1 | C2 | C3 | C4 | B1 | B2 | B3 | | | |
| D1 | | ● | ● | | | ● | | 4.85 | - | |
| D2 | ● | | ● | | | ● | | 2.88 | 1.684 | |
| D3 | | | ● | ● | | ● | ● | 1.951 | 1.476 | |
| D4 | | | ● | ● | | ● | | 1.454 | 1.342 | |
| D5 | ● | | ● | ● | | | ● | 1.179 | 1.233 | Gear ratio span :9.36 |
| D6 | ● | | ● | ● | | | | 1 | 1.179 | Ratio of REV vs D1 :0.67 |
| D7 | | | | ● | | | ● | 0.858 | 1.166 | |
| D8 | ● | ● | | | | | ● | 0.716 | 1.198 | |
| D9 | | ● | ● | | | | ● | 0.616 | 1.162 | |
| D10 | | ● | | | | | ● | 0.518 | 1.189 | |
| REV | ● | ● | | | ● | | | -3.248 | - | |

PLANETARY GEAR TRAIN OF AUTOMATIC TRANSMISSION FOR VEHICLES

CROSS-REFERENCE TO RELATED APPLICATIONS

This application claims priority to and the benefit of Korean Patent Application No. 10-2016-0127464 filed in the Korean Intellectual Property Office on Oct. 4, 2016, the entire contents of which are incorporated herein by reference.

TECHNICAL FIELD

The present invention relates to an automatic transmission for a vehicle. More particularly, the present invention relates to a planetary gear train in automatic transmissions.

BACKGROUND

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission of a vehicle, the number of parts is typically increased, which may deteriorate installation ability, production cost, weight and/or power flow efficiency. Therefore, in order to maximally enhance fuel consumption of an automatic transmission having more shift stages, it is important for better efficiency to be derived by a smaller number of parts. In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven control elements (frictional elements), and may easily become lengthy, thereby deteriorating installation ability. In this regard, disposing planetary gear sets in parallel or employing dog clutches instead of wet-type control elements is sometimes attempted. However, such an arrangement may not be widely applicable, and using dog clutches may easily deteriorate shift-feel.

Considering that gear ratio spans of recently developed eight-speed automatic transmissions are typically between 6.5 and 7.5, fuel consumption enhancement is not very large. In the case of a gear ratio span of an eight-speed automatic transmission having a level above 9.0, it is difficult to maintain step ratios between adjacent shift stages to be linear, by which driving efficiency of an engine and drivability of a vehicle deteriorated. Thus, researches studies are under investigation for developing a high efficiency automatic transmission having nine or more speeds.

The above information disclosed in this Background section is only for enhancement of understanding of the background of the invention and therefore it may contain information that does not form the prior art that is already known in this country to a person of ordinary skill in the art.

SUMMARY

Embodiments of the present invention has been made in an effort to provide a planetary gear train of an automatic transmission for a vehicle having advantages of, by minimal complexity, realizing at least forward tenth speeds and at least one reverse speed, increasing a gear ratio span so as to improve power delivery performance and fuel consumption, and achieving linearity of shift stage step ratios.

A planetary gear train according to an exemplary embodiment of the present invention includes an input shaft for receiving an engine torque; an output shaft outputting changed torque; a first planetary gear set including a first, second, and third rotation elements; a second planetary gear set including a fourth, fifth, and sixth rotation elements; a third planetary gear set including a seventh, eighth, and ninth rotation elements; a fourth planetary gear set including a tenth, eleventh and twelfth rotation elements; a first shaft connected with the first rotational element; a second shaft interconnecting the second rotational element and the fourth rotational element, and connected with the input shaft; a third shaft interconnecting the third rotational element and the tenth rotational element; a fourth shaft interconnecting the fifth rotational element and the eighth element; a fifth shaft connected with the sixth rotational element; and a sixth shaft connected with the seventh rotational element, and selectively connected with the first shaft, the second shaft and the fifth shaft respectively.

The first shaft and the fourth shaft may be selectively connected with a transmission housing respectively, the third shaft may be selectively connected with the fourth shaft. The planetary gear train further include a seventh shaft may connect the ninth rotational element and the twelfth rotational element and be selectively connected with the transmission housing, and an eighth shaft may be connected with the eleventh rotational element and be connected with the output shaft.

The first, second, and third rotational element of the first planetary gear set are respectively a first sun gear, a first planet carrier, and a first ring gear of the first planetary gear set. The fourth, fifth, and sixth rotational element of the second planetary gear set are respectively a second sun gear, a second planet carrier, and a second ring gear of the second planetary gear set. The seventh, eighth, and ninth rotational elements of the third planetary gear set are respectively a third sun gear, a third planet carrier, and a third ring gear of the third planetary gear set. The tenth, eleventh, and twelfth rotational elements of the fourth planetary gear set are respectively a fourth sun gear, a fourth planet carrier, and a fourth ring gear of the fourth planetary gear set.

The first, second, third, and fourth planetary gear sets may be disposed in a sequence of the first, second, third, and fourth planetary gear sets from an engine side.

A planetary gear train according to an exemplary embodiment of the present invention may further include a first clutch selectively connecting the second shaft and the sixth shaft; a second clutch selectively connecting the third shaft and the fourth shaft; a third clutch selectively connecting the first shaft and the sixth shaft; a fourth clutch selectively connecting the fifth shaft and the sixth shaft; a first brake selectively connecting the fourth shaft and the transmission housing; a second brake selectively connecting the seventh shaft and the transmission housing; and a third brake selectively connecting the first shaft and the transmission housing.

A planetary gear train according to an exemplary embodiment of the present invention may realize at least forward tenth speeds and at least one reverse speed formed by operating the four planetary gear sets as simple planetary gear sets by controlling seven control elements.

In addition, a planetary gear train according to an exemplary embodiment of the present invention may realize a gear ratio span of more than 9.0, thereby maximizing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

Advantageously, the planetary gear train of an automatic transmission for a vehicle as described in embodiments of the present invention has minimal complexity, realizing at least forward tenth speeds and at least one reverse speed, increasing a gear ratio span so as to improve power delivery performance and fuel consumption, and achieving linearity of shift stage step ratios.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

FIG. 2 is an operational chart for respective control elements at respective shift stages in a planetary gear train according to an exemplary embodiment of the present invention.

The drawings and description are to be regarded as illustrative in nature and not restrictive, and like reference numerals designate like elements throughout the specification.

DETAILED DESCRIPTION OF ILLUSTRATIVE EMBODIMENTS

Figure 1:
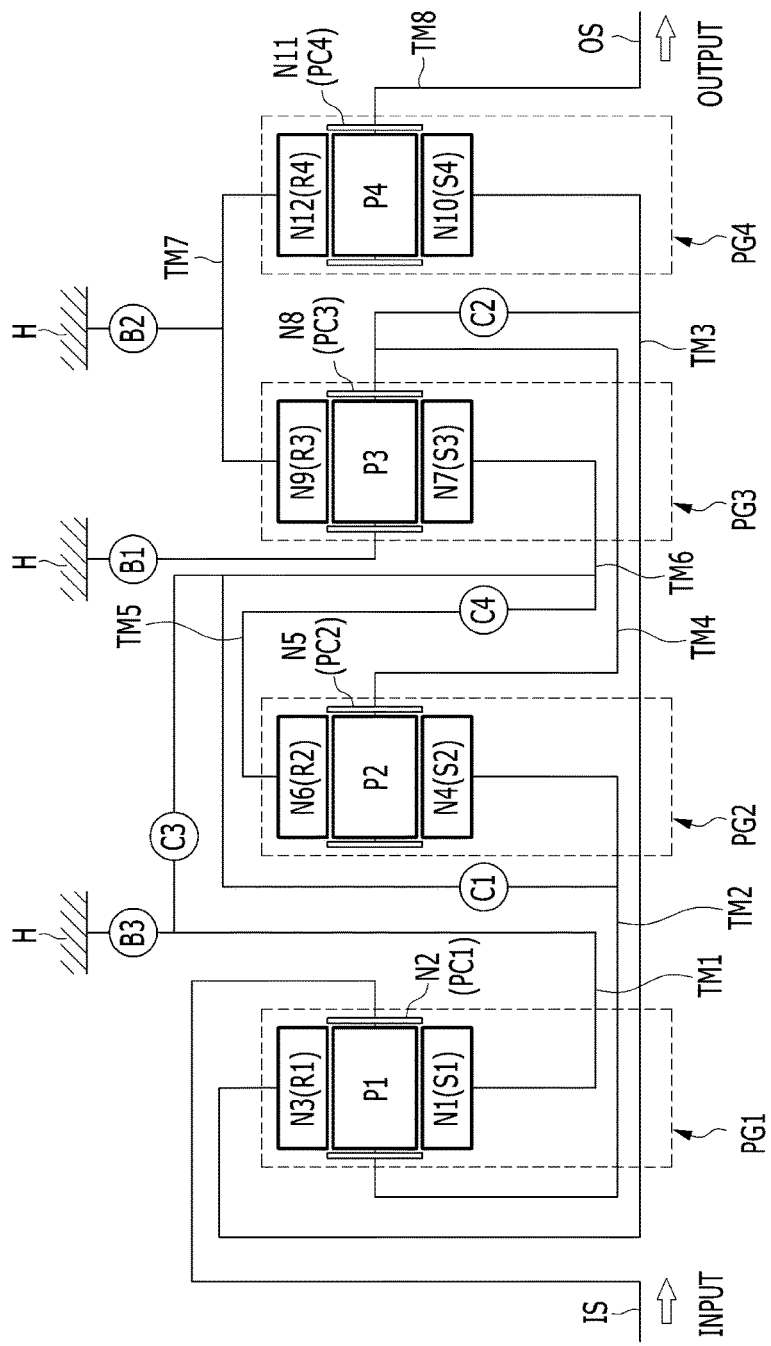
FIG. 1 is a schematic diagram of a planetary gear train according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an embodiment of the present invention includes first, second, third, and fourth planetary gear set PG1, PG2, PG3, and PG4, arranged on a same axis, an input shaft IS, an output shaft OS, eight shafts TM1 to TM8 interconnecting rotational elements of the first, second, third, and fourth planetary gear set PG1, PG2, PG3, and PG4, four clutches C1 to C4 and two brakes B1 and B2 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus (not shown).

The first planetary gear set PG1 is a single pinion planetary gear set, and includes a first planet carrier PC1 that supports first pinion gear P1 externally engaged with the first sun gear S1, and a first ring gear R1 that is internally engaged with the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second planet carrier PC2 that supports second pinion gear P2 externally engaged with the second sun gear S2, and a second ring gear R2 that is internally engaged with the second pinion gear P2. The second sun gear S2 acts as a fourth rotational element N4, the second planet carrier PC2 acts as a fifth rotational element N4, and the second ring gear R2 acts as a sixth rotational element N6.

The third planetary gear set PG3 is a single pinion planetary gear set, and includes a third planet carrier PC3 that supports third pinion gear P3 externally engaged with the third sun gear S3, and a third ring gear R3 that is internally engaged with the third pinion gear P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotational element N10, the fourth planet carrier PC4 acts as a eleventh rotational element N11, and the fourth ring gear R4 acts as a twelfth rotational element N12.

In the first, second, third, and fourth planetary gear sets PG1, PG2, PG3, and PG4, the second rotational element N2 is directly connected with the fourth rotational element N4, the third rotational element N3 is directly connected with the tenth rotational element N10, the fifth rotational element N5 is directly connected with the eighth rotational element N8, and the ninth rotational element N9 is directly connected with the twelfth rotational element N12, by eight shafts TM1 to TM8.

The eight shafts TM1 to TM8 are hereinafter described in detail.

Each of the eight shafts TM1 to TM8 may be a rotational member that directly interconnects the input and output shafts and rotational elements of the planetary gear sets PG1, PG2, PG3, and PG4, or may be a fixed member fixed to the transmission housing H.

The first shaft TM1 is connected with the first rotational element N1 (the first sun gear S1) and is selectively connected with the transmission housing H thereby selectively acting as a fixed element.

The second shaft TM2 connects the second rotational element N2 (the first planet carrier PC1) and the fourth rotational element N4 (the second sun gear S2), and is directly connected with the input shaft IS, thereby always acting as an input element.

The third shaft TM3 connects the third rotational element {N3; first ring gear R1} tenth rotational element {N10; fourth sun gear S4}.

The fourth shaft TM4 connects the fifth rotational element N5 (the second planet carrier PC2) and the eighth rotational element N8 (the third planet carrier PC3), and is selectively connected with the transmission housing H, thereby selectively acting as a fixed element.

The fifth shaft TM5 is connected with the sixth rotational element N6 (the second ring gear R2).

The sixth shaft is connected with the seventh rotational element $N_7$ (the third sun gear S3), and is selectively connected with the first shaft TM1, the second shaft TM2, and the fifth shaft TM5.

The seventh shaft TM7 connects the ninth rotational element N9 (the third ring gear R3) and the twelfth rotational element N12 (the fourth ring gear R4), and is selectively connected with the transmission housing H, thereby selectively acting as a fixed element.

The eighth shaft TM8 is connected with the eleventh rotational element N11 (the fourth planet carrier PC4), and is directly connected with the output shaft OS thereby always acting an output element.

The eight shafts TM1 to TM8, the input shaft IS, and the output shaft OS may be selectively interconnected with one another by control elements of four clutches C1, C2, C3, and C4.

The eight shafts TM1 to TM8 may be selectively connected with the transmission housing H, by control elements of three brakes B1, B2, and B3.

The four clutches C1 to C4 and the three brakes B1 to B3 are arranged as follows.

The first clutch C1 is arranged between the second shaft TM2 and the sixth shaft TM6, and selectively connects the second shaft TM2 and the sixth shaft TM6, thereby controlling power delivery therebetween.

The second clutch C2 is arranged between the third shaft TM3 and the fourth shaft TM4, and selectively connects the third shaft TM3 and the fourth shaft TM4, thereby controlling power delivery therebetween.

The third clutch C3 is arranged between the first shaft TM1 and the sixth shaft TM6, and selectively connects the first shaft TM1 and the sixth shaft TM6, thereby controlling power delivery therebetween.

The fourth clutch C4 is arranged between the fifth shaft TM5 and the sixth shaft TM6, and selectively connects the fifth shaft TM5 and the sixth shaft TM6, thereby controlling power delivery therebetween.

The first brake B1 is arranged between the fourth shaft TM4 and the transmission housing H, and selectively connects the fourth shaft TM4 to the transmission housing H.

The second brake B2 is arranged between the seventh shaft TM7 and the transmission housing H, and selectively connects the seventh shaft TM7 to the transmission housing H.

The third brake B3 is arranged between the first shaft TM1 and the transmission housing H, and selectively connects the first shaft TM1 to the transmission housing H.

The respective control elements of the first, second, third, and fourth clutches C1, C2, C3, and C4 and the first, second, and third brakes B1, B2, and B3 may be realized as multi-plate hydraulic pressure friction devices that are frictionally engaged by hydraulic pressure.

FIG. 2 is an operational chart for respective control elements at respective shift-stages in a planetary gear train according to an exemplary embodiment of the present invention.

Referring to FIG. 2, a planetary gear train according to an exemplary embodiment of the present invention realizes ten forward speeds and one reverse speed by operating three control elements among the first, second, third, and fourth clutches C1, C2, C3, and C4 and the first, second, and third brakes B1, B2, and B3 at respective shift-stages.

In the forward first speed shift-stage D1, the second and third clutches C2 and C3 and the second brake B2 are simultaneously operated.

As a result, the third shaft TM3 is connected with the fourth shaft TM4 by operation of the second clutch C2, and the first shaft TM1 is connected with the sixth shaft TM6 by operation of the third clutch C3. In this state, the torque of the input shaft IS is input to the second shaft TM2.

In addition, the seventh shaft TM7 acts as a fixed element by the operation of the second brake B2, thereby realizing the forward first speed by cooperative operation of respective shafts and outputting a shifted torque to the output shaft OS connected with the eighth shaft TM8.

In the forward second speed shift-stage D2, the first and third clutches C1 and C3 and the second brake B2 are simultaneously operated.

As a result, the second shaft TM2 is connected with the sixth shaft TM6 by operation of the first clutch C1, and the first shaft TM1 is connected with the sixth shaft TM6 by operation of the third clutch C3. In this state, the torque of the input shaft IS is input to the second shaft TM2.

In addition, the seventh shaft TM7 acts as a fixed element by the operation of the second brake B2, thereby realizing the forward second speed by cooperative operation of respective shafts and outputting a shifted torque to the output shaft OS connected with the eighth shaft TM8.

In the forward third speed shift-stage D3, the third clutch C3 and the second and third brakes B2 and B3 are simultaneously operated.

As a result, the first shaft TM1 is connected with the sixth shaft TM6 by operation of the third clutch C3. In this state, the torque of the input shaft IS is input to the second shaft TM2.

In addition, the first shaft TM1 and the seventh shaft TM7 respectively act as fixed elements by the operation of the second and third brakes B2 and B3, thereby realizing the forward third speed by cooperative operation of respective shafts and outputting a shifted torque to the output shaft OS connected with the eighth shaft TM8.

In the forward fourth speed shift-stage D4, the third and fourth clutches C3 and C4 and the second brake B2 are simultaneously operated.

As a result, the first shaft TM1 is connected with the sixth shaft TM6 by operation of the third clutch C3, and the fifth shaft TM5 is connected with the sixth shaft TM6 by the operation of the fourth clutch C4. In this state, the torque of the input shaft IS is input to the second shaft TM2.

In addition, the seventh shaft TM7 acts as a fixed element by the operation of the second brake B2, thereby realizing the forward fourth speed by cooperative operation of respective shafts and outputting a shifted torque to the output shaft OS connected with the eighth shaft TM8.

In the forward fifth speed shift-stage D5, the third and fourth clutches C3 and C4 and the third brake B3 are simultaneously operated.

As a result, the first shaft TM1 is connected with the sixth shaft TM6 by operation of the third clutch C3, and the fifth shaft TM5 is connected with the sixth shaft TM6 by the operation of the fourth clutch C4. In this state, the torque of the input shaft IS is input to the second shaft TM2.

In addition, the first shaft TM1 acts as a fixed element by the operation of the third brake B3, thereby realizing the forward fifth speed by cooperative operation of respective shafts and outputting a shifted torque to the output shaft OS connected with the eighth shaft TM8.

In the forward sixth speed shift-stage D6, the first, third, and fourth clutches C1, C3 and C4 are simultaneously operated.

As a result, the second shaft TM2 is connected with the sixth shaft TM6 by operation of the first clutch C1, the first shaft TM1 is connected with the sixth shaft TM6 by operation of the third clutch C3, and the fifth shaft TM5 is connected with the sixth shaft TM6 by the operation of the fourth clutch C4. In this state, the torque of the input shaft IS is input to the second shaft TM2.

In this case, entire planetary gear sets PG1, PG2, PG3, and PG4 integrally rotate, and a torque is outputted as inputted, thereby forming the forward sixth speed and outputting the inputted torque to the output shaft OS connected with the eighth shaft TM8.

In the forward seventh speed shift-stage D7, the first and fourth clutches C1 and C4, and the third brake B3 are simultaneously operated.

As a result, the second shaft TM2 is connected with the sixth shaft TM6 by operation of the first clutch C1, and the fifth shaft TM5 is connected with the sixth shaft TM6 by the operation of the fourth clutch C4. In this state, the torque of the input shaft IS is input to the second shaft TM2.

In addition, the first shaft TM1 acts as a fixed element by the operation of the third brake B3, thereby realizing the forward seventh speed by cooperative operation of respective shafts and outputting a shifted torque to the output shaft OS connected with the eighth shaft TM8.

In the forward eighth speed shift-stage D8, the second and fourth clutches C2 and C4 and the third brake B3 are simultaneously operated.

As a result, the third shaft TM3 is connected with the fourth shaft TM4 by operation of the second clutch C2, and the fifth shaft TM5 is connected with the sixth shaft TM6 by the operation of the fourth clutch C4. In this state, the torque of the input shaft IS is input to the second shaft TM2.

In addition, the first shaft TM1 acts as a fixed element by the operation of the third brake B3, thereby realizing the forward eighth speed by cooperative operation of respective shafts and outputting a shifted torque to the output shaft OS connected with the eighth shaft TM8.

In the forward ninth speed shift-stage D9, the first and second clutches C1 and C2 and the third brake B3 are simultaneously operated.

As a result, the second shaft TM2 is connected with the sixth shaft TM6 by operation of the first clutch C1, and the third shaft TM3 is connected with the fourth shaft TM4 by operation of the second clutch C2. In this state, the torque of the input shaft IS is input to the second shaft TM2.

In addition, the first shaft TM1 acts as a fixed element by the operation of the third brake B3, thereby realizing the forward ninth speed by cooperative operation of respective shafts and outputting a shifted torque to the output shaft OS connected with the eighth shaft TM8.

In the forward tenth speed shift-stage D10, the second and third clutches C2 and C3 and the third brake B3 are simultaneously operated.

As a result, the third shaft TM3 is connected with the fourth shaft TM4 by operation of the second clutch C2, and the first shaft TM1 is connected with the sixth shaft TM6 by operation of the third clutch C3. In this state, the torque of the input shaft IS is input to the second shaft TM2.

In addition, the first shaft TM1 acts as a fixed element by the operation of the third brake B3, thereby realizing the forward tenth speed by cooperative operation of respective shafts and outputting a shifted torque to the output shaft OS connected with the eighth shaft TM8.

In the reverse speed REV, the first and second clutches C1 and C2, and the first brake B1 are simultaneously operated.

As a result, the second shaft TM2 is connected with the sixth shaft TM6 by operation of the first clutch C1, and the third shaft TM3 is connected with the fourth shaft TM4 by operation of the second clutch C2. In this state, the torque of the input shaft IS is input to the second shaft TM2.

In addition, the fourth shaft TM4 acts as a fixed element by the operation of the first brake B1, realizing the reverse speed by cooperative operation of respective shafts and outputting a reverse torque to the output shaft OS connected with the eighth shaft TM8.

As described above, a planetary gear train according to an exemplary embodiment of the present invention may realize at least ten forward speeds and at least one reverse speed by operating four planetary gear sets PG1, PG2, PG3, and PG4 by controlling the four clutches C1, C2, C3, and C4 and the three brakes B1, B2, and B3.

In addition, a planetary gear train according to an exemplary embodiment of the present invention may realize a gear ratio span of more than 9.0, thereby maximizing efficiency of driving an engine.

In addition, the linearity of step ratios of shift stages is secured while multi-staging the shift stage with high efficiency, securing linearity of step ratios of shift stages, thereby making it possible to improve drivability such as acceleration before and after a shift, an engine speed rhythmic sense, and the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft for receiving an engine torque;
   an output shaft outputting changed torque;
   a first planetary gear set including a first, second, and third rotation elements;
   a second planetary gear set including a fourth, fifth, and sixth rotation elements;
   a third planetary gear set including a seventh, eighth, and ninth rotation elements;
   a fourth planetary gear set including a tenth, eleventh and twelfth rotation elements;
   a first shaft connected with the first rotational element;
   a second shaft interconnecting the second rotational element and the fourth rotational element, and connected with the input shaft;
   a third shaft interconnecting the third rotational element and the tenth rotational element;

a fourth shaft interconnecting the fifth rotational element and the eighth element;
a fifth shaft connected with the sixth rotational element; and
a sixth shaft connected with the seventh rotational element, and selectively connected with the first shaft, the second shaft, and the fifth shaft respectively.

2. The planetary gear train of claim 1, wherein:
the first shaft and the fourth shaft are selectively connected with a transmission housing respectively,
the third shaft is selectively connected with the fourth shaft,
a seventh shaft connects the ninth rotational element and the twelfth rotational element, and is selectively connected with the transmission housing, and
an eighth shaft is connected with the eleventh rotational element, and is connected with the output shaft.

3. The planetary gear train of claim 2, further comprising:
a first clutch selectively connecting the second shaft and the sixth shaft;
a second clutch selectively connecting the third shaft and the fourth shaft;
a third clutch selectively connecting the first shaft and the sixth shaft;
a fourth clutch selectively connecting the fifth shaft and the sixth shaft;
a first brake selectively connecting the fourth shaft and the transmission housing;
a second brake selectively connecting the seventh shaft and the transmission housing; and
a third brake selectively connecting the first shaft and the transmission housing.

4. The planetary gear train of claim 1, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

5. The planetary gear train of claim 1, wherein the first, second, third, and fourth planetary gear sets are disposed in a sequence of the first, second, third, and fourth planetary gear sets from an engine side.

6. A planetary gear train of an automatic transmission for a vehicle, the planetary gear train comprising:
an input shaft for receiving an engine torque;
an output shaft outputting changed torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is connected with the second rotational element,
wherein the output shaft is connected with the eleventh rotational element,
wherein the first rotational element is selectively connected with the seventh rotational element,
wherein the second rotational element is connected with the fourth rotational element, and is selectively connected with the seventh rotational element,
wherein the third rotational element is connected with the tenth rotational element, and is selectively connected with the eighth rotational element,
wherein the fifth rotational element is connected with the eighth rotational element,
wherein the sixth rotational element is selectively connected with the seventh rotational element,
wherein the ninth rotational element is connected with the twelfth rotational element.

7. The planetary gear train of claim 6, wherein the first rotational element, the eighth rotational element, and the ninth rotational element are selectively connected with a transmission housing.

8. The planetary gear train of claim 7, further comprising:
a first clutch selectively connecting the second rotational element and the seventh rotational element;
a second clutch selectively connecting the third rotational element and the eighth rotational element;
a third clutch selectively connecting the first rotational element and the seventh rotational element;
a fourth clutch selectively connecting the sixth rotational element and the seventh rotational element;
a first brake selectively connecting the eighth rotational element and the transmission housing;
a second brake selectively connecting the ninth rotational element and the transmission housing; and
a third brake selectively connecting the first rotational element and the transmission housing.

9. The planetary gear train of claim 6, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

10. The planetary gear train of claim 6, wherein the first, second, third, and fourth planetary gear sets are disposed in a sequence of the first, second, third, and fourth planetary gear sets from an engine side.

* * * * *